(12) United States Patent
Goebel

(10) Patent No.: US 6,974,648 B2
(45) Date of Patent: Dec. 13, 2005

(54) NESTED BIPOLAR PLATE FOR FUEL CELL AND METHOD

(75) Inventor: Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/661,195

(22) Filed: Sep. 12, 2003

(65) Prior Publication Data

US 2005/0058864 A1    Mar. 17, 2005

(51) Int. Cl.$^7$ .............................................. H01M 2/00
(52) U.S. Cl. ....................................................... 429/34
(58) Field of Search .............................. 429/12, 34, 35, 429/38, 39

(56) References Cited

U.S. PATENT DOCUMENTS

| | | |
|---|---|---|
| 4,344,832 A | 8/1982 | Dahlberg |
| 4,769,297 A | 9/1988 | Reiser et al. |
| 4,988,583 A * | 1/1991 | Watkins et al. ............... 429/30 |
| 5,108,849 A | 4/1992 | Watkins et al. |
| 5,230,966 A | 7/1993 | Voss et al. |
| 5,252,410 A | 10/1993 | Wilkinson et al. |
| 5,264,299 A | 11/1993 | Krasij et al. |
| 5,300,370 A | 4/1994 | Washington et al. |
| 5,482,680 A | 1/1996 | Wilkinson et al. |
| 5,514,487 A | 5/1996 | Washington et al. |
| 5,521,018 A | 5/1996 | Wilkinson et al. |
| 5,547,776 A | 8/1996 | Fletcher et al. |
| 5,641,586 A | 6/1997 | Wilson |
| 5,686,199 A | 11/1997 | Cavalca et al. |
| 5,763,113 A | 6/1998 | Meltser et al. |
| 5,773,160 A | 6/1998 | Wilkinson et al. |
| 5,776,624 A | 7/1998 | Neutzler |
| 5,804,326 A | 9/1998 | Chow et al. |
| 5,874,182 A | 2/1999 | Wilkinson et al. |
| 5,928,807 A | 7/1999 | Elias |
| 5,945,232 A | 8/1999 | Ernst et al. |
| 5,981,098 A | 11/1999 | Vitale |
| 6,054,228 A | 4/2000 | Cisar et al. |

(Continued)

FOREIGN PATENT DOCUMENTS

WO    WO 94/09519    4/1994

(Continued)

OTHER PUBLICATIONS

Tallarida, Robert J., Pocket Book of Integrals and Mathematical Formulas, Second Edition, CRC Press, Boca Raton, 2002, pp. 10-11.*

*Primary Examiner*—Patrick Joseph Ryan
*Assistant Examiner*—Melissa Austin
(74) *Attorney, Agent, or Firm*—Harness, Dickey & Pierce, P.L.C.

(57) ABSTRACT

Between adjacent MEA's is a bipolar plate assembly having a first sub-plate with a flow channel which is open to the anode side of the one of the MEA's. A second sub-plate has a flow channel which is open to the cathode side of the adjacent MEA. The sub-plates are nested together to form a coolant flow channel between the sub-plates. The coolant flow path has a height dimension wherein the distance between the adjacent MEA's is substantially unaffected by the height dimension of the coolant flow path. A method of manufacturing a bi-polar plate assembly includes forming a closed coolant flow channel between the sub-plates by nesting the sub-plates together. A method of operating a fuel cell includes passing the coolant through a flow path having a height dimension which is substantially aligned with the height dimension of the hydrogen flow path, the oxygen flow path, or both.

16 Claims, 3 Drawing Sheets

U.S. PATENT DOCUMENTS

| | | |
|---|---|---|
| 6,099,984 A | 8/2000 | Rock |
| 6,159,629 A | 12/2000 | Gibb et al. |
| 6,174,616 B1 | 1/2001 | Marvin et al. |
| 6,261,710 B1 * | 7/2001 | Marianowski ............... 429/34 |
| 6,309,773 B1 | 10/2001 | Rock |
| 6,322,919 B1 | 11/2001 | Yang et al. |
| 6,358,642 B1 | 3/2002 | Griffith et al. |
| 6,503,653 B2 | 1/2003 | Rock |
| 2002/0150809 A1 * | 10/2002 | Hammerschmidt et al. ... 429/34 |
| 2003/0224239 A1 * | 12/2003 | Carlstrom .................... 429/38 |

FOREIGN PATENT DOCUMENTS

| | | | |
|---|---|---|---|
| WO | WO 00/17952 | 3/2000 | |
| WO | WO 2003050905 A2 * | 6/2003 | ........... H01M 4/94 |

* cited by examiner

NESTED BIPOLAR PLATE FOR FUEL CELL AND METHOD

FIELD OF THE INVENTION

This invention relates generally to PEM fuel cells and more particularly to bipolar plates separating adjacent fuel cells in a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. The oxygen can be either a pure form ($O_2$) or air (a mixture of $O_2$ and $N_2$). PEM fuel cells include a membrane electrode assembly (MEA) comprising a thin, proton transmissive, non-electrically conductive, solid polymer electrolyte membrane having the anode catalyst on one face and the cathode catalyst on the opposite face.

The MEA is sandwiched between a pair of non-porous, electrically conductive elements or plates which (1) pass electrons from the anode of one fuel cell to the cathode of the adjacent cell of a fuel cell stack, (2) contain appropriate channels and/or openings formed therein for distributing the fuel cell's gaseous reactants over the surfaces of the respective anode and cathode catalysts; and (3) contain appropriate channels and/or openings formed therein for distributing appropriate coolant throughout the fuel cell stack in order to maintain temperature.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,763,113.

In a fuel cell stack, a plurality of cells are stacked together in electrical series while being separated by a gas impermeable, electrically conductive bipolar plate. In some instances, the bipolar plate is an assembly formed by securing a pair of thin metal sheets having reactant flow fields formed on their external face surfaces. Typically, an internal coolant flow field is provided between the metal plates of the bipolar plate assembly. It is also known to locate a spacer plate between the metal plates to optimize the heat transfer characteristics for improved fuel cell cooling. Various examples of a bipolar plate assembly of the type used in PEM fuel cells are shown and described in commonly-owned U.S. Pat. No. 5,776,624, issued Jul. 17, 1998 and hereby incorporated herein by reference. The internal coolant flow field consumes space within the fuel cell, typically increasing the required distance between adjacent MEA's.

SUMMARY OF THE INVENTION

In accordance with a first aspect of the present invention, a fuel cell is provided. The fuel cell includes a pair of MEAs separated from each other by a distance. Each of the MEAs has an anode side and a cathode side. A bipolar plate assembly is located between the anode side of one of the pair of MEAs and the cathode side of the other of the pair of MEAs. The bipolar plate assembly has a first sub-plate with a flow channel which is open to the anode side of the one of the pair of MEAs. The bipolar plate assembly also has a second sub-plate with a flow channel which is open to the cathode side of the other of the pair of MEAs. The first sub-plate and the second sub-plate are nested together to form a coolant flow channel between the first and second sub-plates.

In accordance with another aspect of the present invention a method of manufacturing a bi-polar plate assembly useful in a fuel cell is provided. The method includes forming an open channel on a side of a first sub-plate adapted to face the anode side of a MEA. An open channel is formed on a side of a second sub-plate adapted to face the cathode side of an adjacent MEA. A closed channel is formed between the sub-plates adapted for coolant flow therethrough by nesting the first and second sub-plates together.

In accordance with yet another aspect of the present invention a method of operating a fuel cell having a plurality of adjacent MEAs is provided. The method includes passing oxygen through a flow path in communication with a cathode side of the MEA. Hydrogen is passed through a flow path in communication with an anode side of the MEA. Each of the hydrogen and oxygen flow paths has a height dimension. Coolant is also passed through a flow path having a height dimension which is substantially aligned with the height dimension of the hydrogen flow path, the oxygen flow path, or both.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
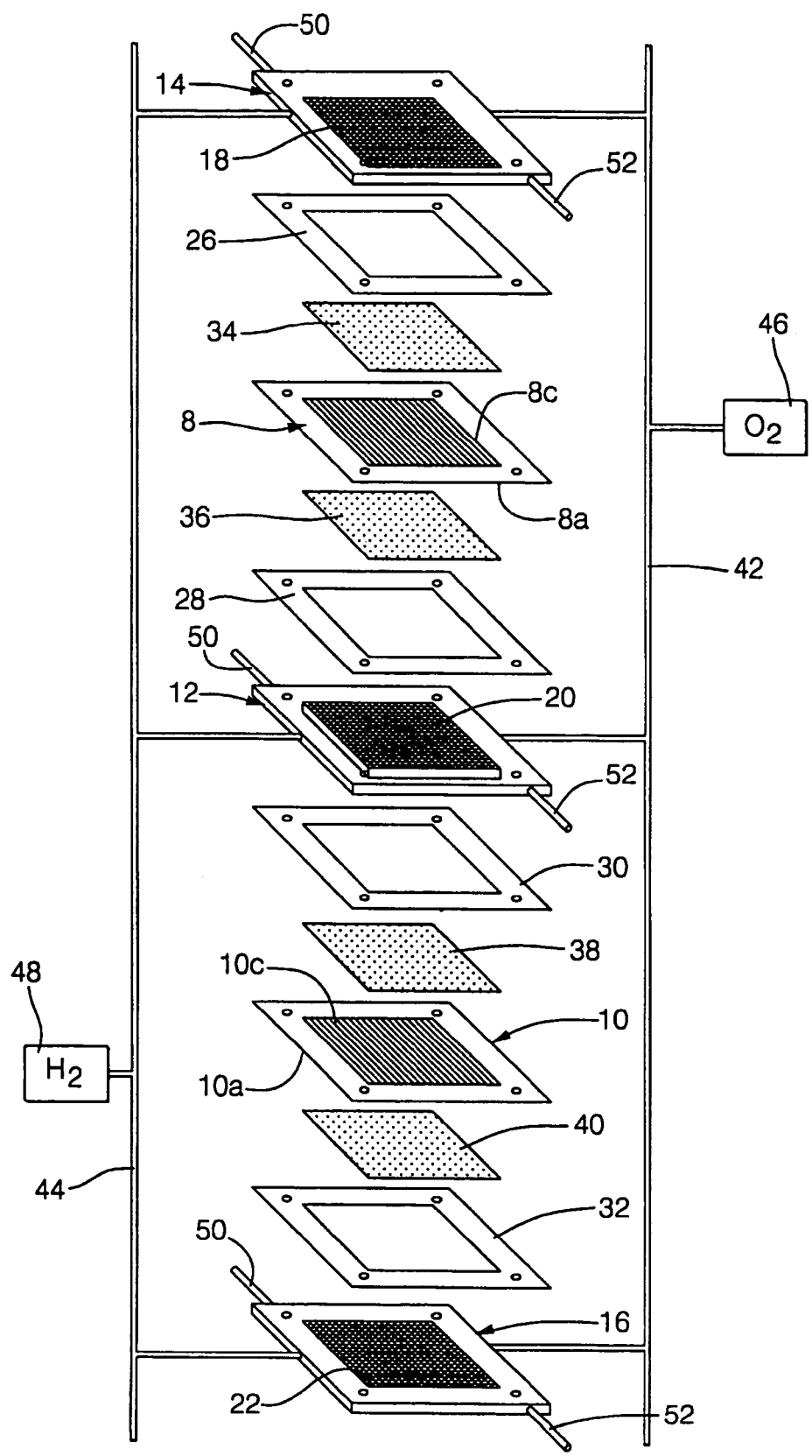
FIG. 1 is a schematic isometric exploded illustration of a PEM fuel stack incorporating a bipolar plate assembly of the present invention.

FIG. 1 schematically depicts a partial PEM fuel cell stack having a pair of membrane-electrode-assemblies (MEAs) 8 and 10 separated from each other by non-porous, electrically-conductive bipolar plates 12, 14, 16. Each of the MEAs 8, 10 have a cathode face 8c, 10c and an anode face 8a, 10a. The MEAs 8 and 10, and bipolar plates 12, 14, 16 are typically stacked together with additional similar components to form a fuel cell stack.

As detailed more fully hereinafter, the bipolar plates 12, 14 and 16 each include flow fields 18, 20 and 22 having a plurality of flow channels formed in the faces of the plates for distributing fuel and oxidant gases (i.e., $H_2$ & $O_2$) to the reactive faces of the MEAs 8 and 10 and for distributing coolant between the plates. Nonconductive gaskets or seals 26, 28, 30, and 32 provide a seal and electrical insulation between the several plates of the fuel cell stack. Porous, gas permeable, electrically conductive sheets 34, 36, 38 and 40 press up against the electrode faces of the MEAs 8 and 10 and serve as primary current collectors for the electrodes. Primary current collectors 34, 36, 38 and 40 also provide mechanical supports for the MEAs 8 and 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass therethrough.

Bipolar plate 14 presses up against the primary current collector 34 on the cathode face 8c of MEA 8 and bipolar plate 16 presses against primary current collector 40 on the anode face 10a of MEA 10. Similarly, bipolar plate 12 presses up against the primary current collector 36 on the anode face 8a of MEA 8 and against the primary current collector 38 on the cathode face 10c of MEA 10. An oxidant gas such as oxygen is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and oxygen supplied to the cathode side from the ambient air. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$-depleted anode gas from the anode flow field and $O_2$-depleted cathode gas from the cathode flow field. Coolant plumbing 50 and 52 is provided for supplying and exhausting liquid coolant to the bipolar plates 12, 14 and 16, as needed.

Figure 2:
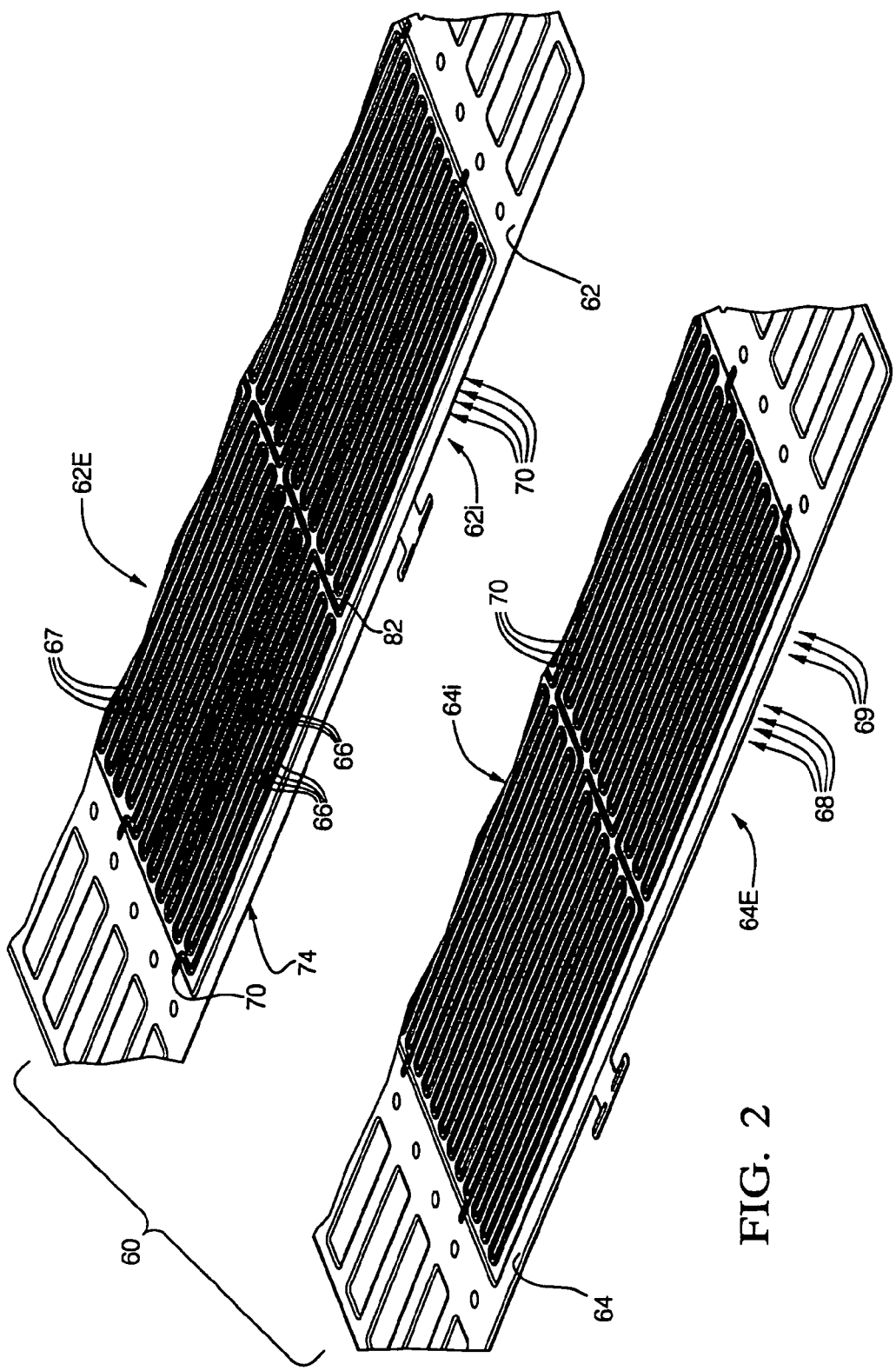
FIG. 2 is an exploded view of a bipolar plate assembly used within the fuel cell of FIG. 1.

Referring to FIG. 2, it can be seen that each of the bipolar plates 12, 14, and 16 is actually a bipolar plate assembly 60 made up of two sub-plates 62, 64. This bipolar plate assembly 60 is the same for each of the bipolar plates 12, 14, and 16 of FIG. 1. The sub-plates 62, 64 include serpentine channels 66, 68 forming a flow path in a flow field in the outer or external surfaces 62e, 64e of the bipolar plate assembly 60. Each serpentine channel 66, 68 has a land region 67, 69 adjacent thereto. In addition, the various channels 66, 68 of the sub-plates result in opposing channels 70 on the internal faces 62i, 64i of the thin metal sub-plates 62 and 64, respectively. These opposing channels 70 are contained within the land regions 67, 69. Thus, when the sub-plates are nested together a flow path (or channel) 70 for a coolant flow field is formed between the interior surfaces 62i, 64i of the nested sub-plates 62, 64. This is explained in more detail with respect to specific preferred embodiments described hereinafter.

Figure 3:
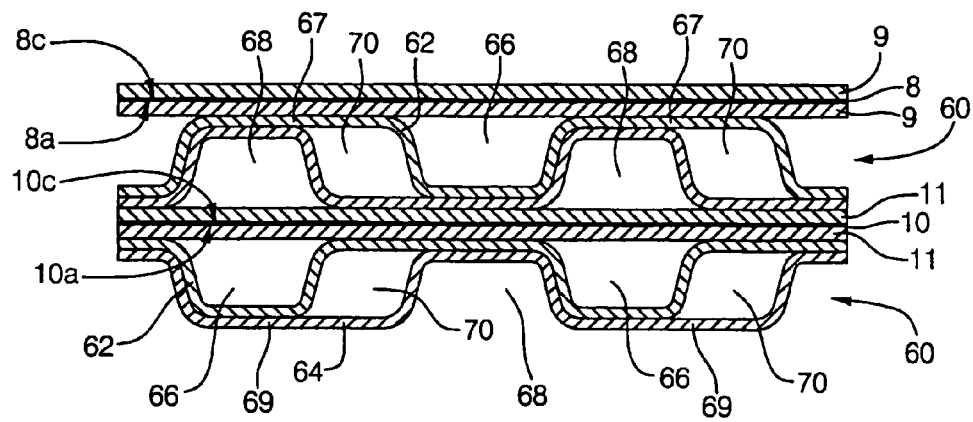
FIG. 3 is an enlarged, partial, cross-sectional view of a preferred bipolar plate assembly located against the sides of adjacent MEAs.

Referring to FIG. 3, a first preferred embodiment of a nested bipolar plate assembly 60 of the present invention is illustrated. This bipolar plate assembly 60 is formed from two sub-plates 62, 64. Each sub-plate 62, 64 is formed from a thin walled non-corrosive sheet of metal. Preferably, the thickness of the metal sheet is from about 0.002 to about 0.02 inches. The non-corrosive metal is preferably stainless steel.

Each of the sub-plates 62, 64 has been stamped to form the flow channels 66, 68 and 70 when the plates are nested together to form the bipolar plate assembly 60. The flow channels include oxygen flow channels 68 for the cathode side 8c, 10c of the MEAs 8, 10, hydrogen flow channels 66 for the anode side 8a, 10a and coolant flow channels 70. A first group of land regions 67 are located adjacent to the hydrogen flow channels 66 and a second group of land regions 69 are located adjacent to the oxygen flow channels 68. The land regions 67, 69 contain the coolant flow channels 70. More specifically, the first group of land regions 67 contains both the coolant flow channels 70 and the oxygen flow channels 68. The second group of land regions 69 contains both the coolant flow channels 70 and the hydrogen flow channels 66. Each of the hydrogen, oxygen and coolant flow channels 66, 68 and 70, respectively, has a height which is substantially the same as the height of the other flow channels. As used herein, height refers to the vertical direction as seen in the drawings. The space between the MEAs created by the bipolar plate assembly 60 is substantially the same as the height of each of the flow channels 66, 68, 70. Preferably, the space between the MEAs is no more than about 1.3 times the height of one of the flow channels; more preferably, no more than 1.2 times; and even more preferably, no more than 1.1 times.

The external surfaces 62e, 64e of each of the sub-plates 62, 64 includes a channel 66, 68 providing the hydrogen flow path or the oxygen flow path, respectively. Thus, the oxygen and hydrogen flow paths are open against the anode and cathode sides of the MEA, 8a, 10a and 8c, 10c respectively. The MEA 8, 10 typically includes a diffusion media 9, 11 to enable the oxygen and hydrogen to flow into the MEA 8, 10 across the land regions 67, 69 created by the flow sub-plates 62, 64; thereby enabling the gaseous reactants to contact the entire face of the MEA 8, 10. Each of the land regions 67, 69 has a width generally twice the width of the flow channel 66, 68 contained therein. This creates an effective lateral distance over which the fluids must travel in order to use the entire face of the MEA 8, 10. This distance, commonly referred to as diffusion distance, is generally one-half of the distance between the edges of laterally adjacent like flow channels.

The inner surface 62i, 64i of each of the sub-plates 62, 64 face toward each other and form the coolant flow path 70 therebetween. The coolant flow path 70 is created by nesting the sub-plates 62, 64 together. It is preferred that the height dimension of the coolant flow path 70 is substantially within (i.e., not extending up or down past either end except in an insubstantial way) the height dimension of at least one of the oxygen and hydrogen flow paths 66, 68 or that the height dimension of the coolant flow path is substantially aligned with the height dimension of at least one of the oxygen and hydrogen flow paths. All three of the flow paths 66, 68, 70 of this embodiment are provided within a height dimension which is substantially the same as the height of each of the other flow paths. It can be seen that the distance between the MEAs 8, 10 is substantially unaffected by the height dimension of the coolant flow path 70, since the height dimension of the overall plate assembly is substantially the same as the height dimension of the oxygen flow path 68 and the hydrogen flow path 66, together.

Figure 4:
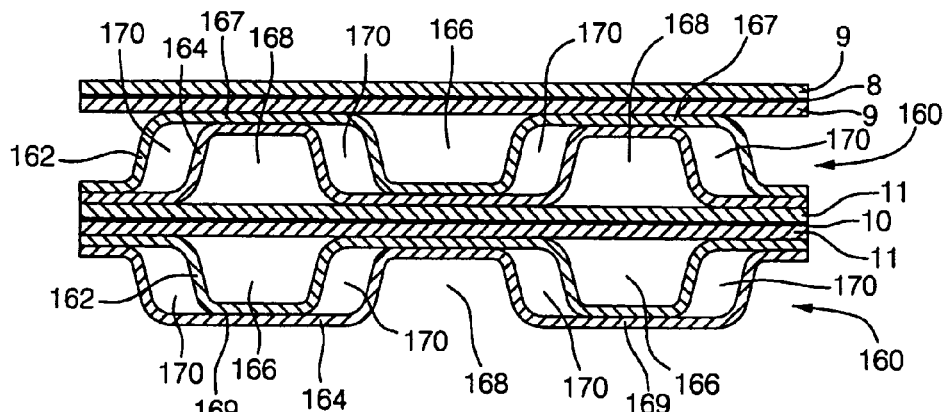
FIG. 4 is an enlarged, partial, cross sectional view similar to FIG. 3 of an alternative preferred bipolar plate assembly.

Referring to FIG. 4, an alternative preferred embodiment of a bipolar plate assembly 160 formed from nested sub-plates 162, 164 is illustrated. This alternative preferred embodiment is similar in many respects to that of the previous preferred embodiment 60. However, the plates 162, 164 are nested so that the flow path channels 166, 168 which form the hydrogen and oxygen flow paths are centered in the land regions 167, 169. This creates a coolant flow path channel 170 along each side of the hydrogen and oxygen flow path channels 166, 168. Thus, for each oxygen flow path 168 and hydrogen flow path 166, there are two coolant flow paths 170. Although the cross-sectional area of each of the coolant flow paths 170 is smaller than that of the oxygen flow path 168 and the hydrogen flow path 166, the surface area of the combined coolant flow paths 170 (or flow field) is greater than the surface area of the of the oxygen flow path 168 and the hydrogen flow path 176 and of the coolant flow path 70 of the previous embodiment. In this case, the surface area of the coolant flow path 170 is about 1.5 times the surface area of each of the oxygen flow path 168 and the hydrogen flow path 166. Increasing the surface area of the coolant flow path 170 provides for more effective heat transfer.

Moreover, the uncooled conduction distance between the coolant flow paths 170 is reduced in this embodiment. Preferably the uncooled conduction distance between coolant flow paths is less than the distance between adjacent hydrogen flow paths 166, oxygen flow paths 168, or both. Furthermore, the two sub-plates 162, 164 do not need to fit tightly within each other.

Figure 5:
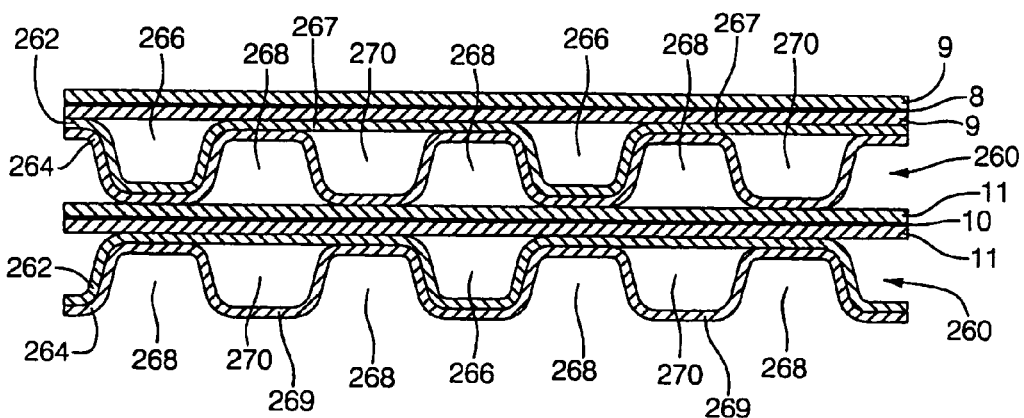
FIG. 5 is an enlarged, partial, cross sectional view similar to FIG. 3 of another alternative preferred bipolar plate assembly

Referring to FIG. 5, another alternative preferred embodiment of a bipolar plate assembly 260 of the present invention is illustrated. In this embodiment, the upper sub-plate 262 is formed with a series of hydrogen channels 266 spaced relatively far apart; forming relatively wide land regions 267, 269. The lower sub-plate 264 includes a pair of narrower channels that nest between the hydrogen flow channels 266 in the wider channels 270 of the upper sub-plate created by the wide land regions 267. This allows three separate channels 268, 270, 268 to be formed in this area when the sub plates 262, 264 are nested together. The two of these channels 268 which are open to the cathode side of the MEA provide oxygen flow paths. The third channel 270 is confined between the two sub-plates 262, 264 and provides a coolant flow path 270. In order to accommodate the three channels 268, 270, 268, the land regions 267 are generally the width of the three channels 268, 270, 268 combined. The hydrogen flow path 266 is provided adjacent to these three flow paths which is open to the anode side of the MEA.

As with each of the embodiments previously described above, the oxygen and hydrogen travel laterally through the diffusion media 9, 11 to contact the MEA over its entire surface. This embodiment takes advantage of the fact that the hydrogen can travel more readily through the diffusion media 9, 11 than the oxygen. As a result, the hydrogen can more readily travel further laterally to provide effective performance over a larger surface area of the MEA 8, 10. In the previous embodiments, both the hydrogen and oxygen needed to travel the same distance; about one-half the distance of the land area in contact with the sides of the MEA 8, 10. In this case, the hydrogen needs to travel laterally about one-half of the distance of the large land area against the anode side of the MEA 8a, 10a (that is, the land area separating the hydrogen flow paths). In contrast, the larger oxygen molecule needs to travel only about one-half of the smaller land area separating the oxygen flow paths. This means that the oxygen needs to only travel laterally about one-third of the distance that the hydrogen needs to travel through the diffusion media 9, 11.

A preferred process for manufacturing the preferred bipolar plate assemblies 60 and fuel cells incorporating them includes forming open channels 66, 68 in two thin sheets of metal to form the sub-plates 62, 64. Except where specific reference is made to a particular embodiment below, reference numerals from the embodiment of FIG. 3 will be listed below for simplicity. The channels 66, 68 are preferably formed by stamping the metal sheets, although other forming steps may be used; for example, photoetching (i.e., through a photolithographic maze) or chemical or other conventional processes may be used. Each sub-plate 62, 64 includes open channels 66, 68 that are adapted to face the cathode side 8c, 10c or the anode side 8a, 10a of an MEA 8, 10, respectively. The sub-plates 62, 64 are then nested together to form a closed channel 70 between the sub-plates 62, 64. This closed channel 70 is adapted for coolant flow therethrough.

The forming operation provides each of the respective channels 66, 68 and 70 with a height dimension. Nesting substantially aligns the height dimension of the cooling channel 70 with the height dimension of the hydrogen flow channel 66, the oxygen flow channel 68, or both. The cooling of flow channel 70 can be substantially aligned without necessitating that it stop and start substantially at the same height location. The channels 66 and/or 68 are aligned when the cooling flow channel 70 does not extend past the stopping or starting height of the corresponding flow channel(s) 66 and/or 68, other than in an insubstantial way. In addition, nesting the sub-plates 62, 64 together preferably locates the height dimension of the closed channel to substantially within the height dimension of the open channel 66, adapted to face the anode side or the open channel 68 adapted to face the cathode side. Similarly, the distance between a pair of adjacent MEAs 8, 10 is substantially unaffected by the height dimension of the coolant flow channel 70.

The forming and/or nesting operations may be accomplished to form flow channels 66, 68, 70, or flow paths of various configurations. For example, the nesting operation is adapted to form a plurality of coolant flow channels 170 for the coolant as seen in FIG. 4, and to form a plurality of flow channels 268 facing the cathode for each flow channel 266 facing the anode as seen in FIG. 5. Further, spacing the plurality of anode facing channels 266 a first lateral distance apart from each other and spacing the plurality of cathode facing channels 268 a second lateral distance apart from each other that is less than the first lateral distance is accomplished as seen in FIG. 5.

The sub-plate assemblies 60 can then be assembled as part of a MEA fuel cell as seen in FIG. 1. The open channel 66 on the side of the first sub-plate 62 is located against the anode side of a MEA 8a and the open channel 68 on the side of the second sub-plate 64 is located against the cathode side of an adjacent MEA 10c. Typically a plurality of fuel cells are located within a fuel cell housing (not shown) and thereby retained together. Appropriate manifolds are also provided to enable sealed fluid communication with each of the oxygen flow path 68, the hydrogen flow path 66 and the coolant flow path 70 so the appropriate reactant or coolant may be delivered for flow through the respective channels.

A preferred process for operating a fuel cell having a preferred bipolar plate assembly 60 includes passing oxygen through a flow path 68 in communication with a cathode side of the MEA 10c. In addition, hydrogen is passed through a flow path 66 in communication with an anode side of an adjacent MEA 8a. Each of the oxygen flow path 68 and the hydrogen flow path 66 have a height dimension. Preferably, these height dimensions are substantially aligned with each other. Coolant is also passed through a flow path 70 having a height dimension which is substantially aligned with the height dimension of the hydrogen flow path 66, the oxygen flow path 68, or both. Similarly, the distance between a pair of adjacent MEAs 8, 10 is substantially unaffected by the height dimension of the coolant flow path 70. Instead it is driven by the height of the hydrogen flow path 66, and/or the oxygen flow path 68 and/or the location of their corresponding height dimensions.

As exemplified by the bipolar plate assembly 260 of FIG. 5, the method of operation also preferably includes passing the hydrogen through a first effective lateral distance of a diffusion media 9, 11; and passing the oxygen along a second effective lateral distance of a diffusion media 9, 11 which is less than that of the first effective lateral distance. Many other process variations are possible. For example, as seen with the embodiment of FIG. 4, the coolant is passed through a flow path that includes a plurality of flow channels 170. This embodiment also exposes the coolant to an external surface area which is greater than an external surface area of the oxygen flow path 168 and/or the hydrogen flow path 166. Further, the flow path 170 for the coolant passes the coolant along a pair of opposite lateral sides of a channel of the cathode flow path 168 and/or of the anode flow path 166.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell, comprising:
   a pair of membrane electrode assemblies (MEAs) separated from each other by a distance, each MEA having an anode side and a cathode side;
   a bipolar plate assembly located between the anode side of one of the pair of MEAs and the cathode side of the other of the pair of MEAs, the bipolar plate assembly having:
      a first sub-plate with a flow channel which is open to the anode side of the one of the pair of MEAs and a land region adjacent to said flow channel in said first sub-plate;
      a second sub-plate with a flow channel which is open to the cathode side of the other of the pair of MEAs and a land region adjacent to said flow channel in said second sub-plate, the first sub-plate and the second sub-plate being nested together to form a coolant flow channel between the first and second sub-plates, one of said land region adjacent to said flow channel in said first sub-plate and said land region adjacent to laid flow channel in said second sub-plate having a width substantially greater than a width of said flow channel in the other of said first sub-plate and said second sub-plate.

2. A fuel cell according to claim 1, wherein the flow channel of the first sub-plate and the flow channel of the second sub-plate are laterally centered with respect to each other to form a plurality of coolant flow channels.

3. A fuel cell according to claim 2, wherein the flow channels have a surface area and wherein the combined surface area of the plurality of coolant flow channels is greater than the surface area of the flow channel which is open to the cathode side or the surface area of the flow channel which is open to the cathode side.

4. A fuel cell according to claim 1, wherein the second sub-plate includes a plurality of flow channels open to the cathode side which correspond to the flow channel of the first sub-plate open to the cathode side.

5. A fuel cell according to claim 1, wherein the coolant flow path has a height dimension which is substantially within a height dimension of the cathode flow path, the anode flow path or both.

6. A fuel cell according to claim 1, wherein at least one of the flow channel which is open to the anode side or the flow channel which is open to the cathode side, or both provide a serpentine flow path.

7. A fuel cell according to claim 1, wherein one of said land region in said first sub-plate and said land region in said second sub-plate has a width at least twice as large as a width of said flow channel of the other of said first sub-plate and said second sub-plate.

8. A fuel cell according to claim 7, wherein one of said land region in said first sub-plate and said land region in said second sub-plate has a width at least three times as large as a width of said flow channel of the other of said first sub-plate and said second sub-plate.

9. A fuel cell according to claim 7, wherein one of said land region in said first sub-plate and said land region in said second sub-plate has a width at least twice as large as a width of said flow channel of the other of said first sub-plate and said second sub-plate and is adapted to house at least two coolant channels therein.

10. A fuel cell according to claim 1, wherein said land region of said first sub-plate has a width generally equal to a width of said land region of said second sub-plate.

11. A fuel cell according to claim 1, wherein said flow channel and said adjacent land region in said first sub-plate has a cross section similar to a cross section of said flow channel and said adjacent land region in said second sub-plate.

12. A fuel cell according to claim 1, wherein said land region of said first sub-plate has a width generally greater than a width of said flow channel in said first sub-plate and said land region of said second sub-plate has a width generally greater than a width of said flow channel in said second sub-plate.

13. A fuel cell according to claim 1, wherein at least one of said first sub-plate and second sub-plate abuts said land region of the other of said first sub-plate and second sub-plate.

14. A fuel cell according to claim 1, further comprising a first wall extending from said land region on said first sub-plate and a second wall extending from said land region on said second sub-plate, said first and second walls generally abutting one another.

15. A fuel cell according to claim 1, wherein said land region of said first sub-plate has a width substantially greater than said land region of said second sub-plate.

16. A fuel cell according to claim 1, wherein said flow channel of said first sub-plate is disposed against a land region of said second sub-plate and a flow channel of said second sub-plate is disposed against a land region of said first sub-plate.

* * * * *